United States Patent
Tervo et al.

(10) Patent No.: US 7,478,146 B2
(45) Date of Patent: Jan. 13, 2009

(54) SYSTEM, APPARATUS, AND METHOD FOR COMMUNICATING CAPABILITIES OF A MOBILE DEVICE

(75) Inventors: Timo P. Tervo, Oulu (FI); Martti Lindroos, Oulu (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 10/700,346

(22) Filed: Nov. 3, 2003

(65) Prior Publication Data
US 2005/0096016 A1 May 5, 2005

(51) Int. Cl.
G06F 15/177 (2006.01)
G06F 15/16 (2006.01)
(52) U.S. Cl. ........................ 709/220; 709/227
(58) Field of Classification Search .................. 709/227, 709/228, 230
See application file for complete search history.

(56) References Cited

U.S. PATENT DOCUMENTS 7,191,236 B2 3/2007 Simpson-Young et al.
2003/0202016 A1* 10/2003 Acton .......................... 345/776
2004/0052233 A1* 3/2004 Skog et al. ................... 709/227
2005/0060411 A1* 3/2005 Coulombe et al. ........... 709/227

OTHER PUBLICATIONS

Nov. 10, 1999, Wireless Application Group, "User Agent Profile Specification".
May 20, 2003, Open Mobile Alliance, "User Agent Profile".
Jun. 2003, 3GPP, "IP Multimedia Subsystem (IMS)", 3GPP TS 23.228 V5.9.0, Release 5.
Feb. 17, 2003, Camarillo et al., "Transcoding Services Invocation in the Session Initiation Protocol".
Oct. 25, 2002, Campbell et al., "Instant Message Transport Sessions using the CPIM Message Format".

* cited by examiner

Primary Examiner—Paul H Kang
(74) Attorney, Agent, or Firm—Hollingsworth & Funk, LLC

(57) ABSTRACT

The present disclosure relates to a system, apparatus, and method for providing services usable by a mobile terminal. In one embodiment, a method involves initiating a device startup sequence of a mobile computing arrangement. A capability descriptor of the mobile computing arrangement is communicated to a service provider entity as part of the startup sequence. A data service targeted for the mobile device based on the capability descriptor communicated to the service provider, and the data service is then initiated with the mobile computing arrangement.

34 Claims, 6 Drawing Sheets

SYSTEM, APPARATUS, AND METHOD FOR COMMUNICATING CAPABILITIES OF A MOBILE DEVICE

FIELD OF THE INVENTION

This invention relates in general to mobile electronics, and more particularly to network data processing services usable by mobile devices.

BACKGROUND OF THE INVENTION

Advances in communication infrastructures and protocols have turned computing devices into valuable communications tools. Digital networks are increasingly used for all manner of communications, including voice and video. Mobile communications devices, such as mobile phones, Personal Digital Assistants (PDAs), and the like, have been increasingly designed to interface with these digital networks. Mobile devices can communicate over wireless links, making them uniquely suited to providing convenient and continuous access to users. Many data processing capabilities that were previously only available on desktop computers have migrated to mobile devices due to the increasing processing power available in such devices.

Today, such wireless devices are being used for a variety of different types of communication. For example, current technologies have created wireless devices that are powerful communication tools, capable of communicating voice, data, images, video, and other multimedia content. Mobile phones, at one time solely a voice communication tool, now often include network communication capabilities such as e-mail, World Wide Web browsing, etc.

With the integration of wireless and landline network infrastructures, a multitude of new services are arising, and various information types can be conveniently communicated between wireless and/or landline terminals. As a result, devices that access these services are dealing with a wide variety of content and services. As these services migrate to mobile devices, it will be beneficial to initiate ad hoc sessions with mobile devices that take advantage of advanced content and services.

Due to the wide variety of mobile devices, however, it may not be evident what services a mobile device can handle when it connects to a network. Mobile devices can access many different types of networks and connect at any given location. Capabilities of the particular device in use may not be apparent without some action on the part of the user, therefore it is difficult to know whether the device supports advanced services after it connects to a network.

Numerous benefits may be realized from providing advanced content and services on mobile devices, since these devices can provide immediate and continuous access to users. As mobile device become more sophisticated and ubiquitous, a way of automatically providing advanced services to these devices will become more important.

SUMMARY OF THE INVENTION

The present disclosure relates to a system, apparatus, and method for providing services usable by a mobile terminal. In one embodiment, a method involves initiating a device startup sequence of a mobile computing arrangement. A capability descriptor of the mobile computing arrangement is communicated to a service provider entity as part of the startup sequence. A data service targeted for the mobile device based on the capability descriptor communicated to the service provider, and the data service is then initiated with the mobile computing arrangement.

In more particular embodiments, the capability descriptor may include a User Agent Profile (UAProf) descriptor, or a Universal Resource Locator (URL) that references a UAProf descriptor. In other arrangements, the capability descriptor may include a terminal model number and/or a UAProf header.

In other particular embodiments, the capability descriptor may be communicated to services provider via any combination of a wireless network control channel, Short Message Service (SMS), and a secondary network interface utilizing Wireless LAN (WLAN) or Bluetooth.

BRIEF DESCRIPTION OF THE DRAWINGS

The invention is described in connection with the embodiments illustrated in the following diagrams.

DETAILED DESCRIPTION OF THE INVENTION

In the following description of the example embodiments, reference is made to the accompanying drawings which form a part hereof, and in which is shown by way of illustration various example embodiments in which the invention may be practiced. It is to be understood that other embodiments may be utilized, as structural and operational changes may be made without departing from the scope of the present invention.

Generally, the present disclosure is directed to a system, apparatus, and method of providing services to mobile devices. The mobile devices can be configured to send a capabilities descriptor to a service provider during a start up sequence of the mobile devices. The capabilities descriptor allows the services provider to initiate data services with the terminals based on the capabilities descriptor.

The capabilities descriptor can provide the service provider with the ability to know beforehand whether a given mobile terminal can utilize or communicate with a particular service. For example, a service provider may desire to initiate a service such as a multimedia session with a mobile terminal. Such a multimedia session may be implemented using a variety of formats, protocols, and other application-specific parameters that relate to the session. The mobile terminal may be able to communicate using some session characteristics, but not others. The capabilities may be built-in to the terminal, such as in hardware circuitry or standard terminal software. The capabilities may also change over time, such as when the terminal downloads a new software module or codec.

Although the mobile terminal may be able to inform the service provider of the terminal's capability when the terminal user initiates a session, this does not necessarily occur when the service provider initiates the session. If the user does not first initiate a session using advanced features of the mobile terminal, the service provider may have no indication of the terminal's capabilities. Because the terminal is mobile, it may appear without warning on any geographically located network. Therefore, the network cannot assume a recently connected terminal has any capabilities other than the minimal set of capabilities needed to connect to the network bearer. This may prevent a service provider from initiating a session utilizing advanced features of the mobile terminal.

Figure 1:
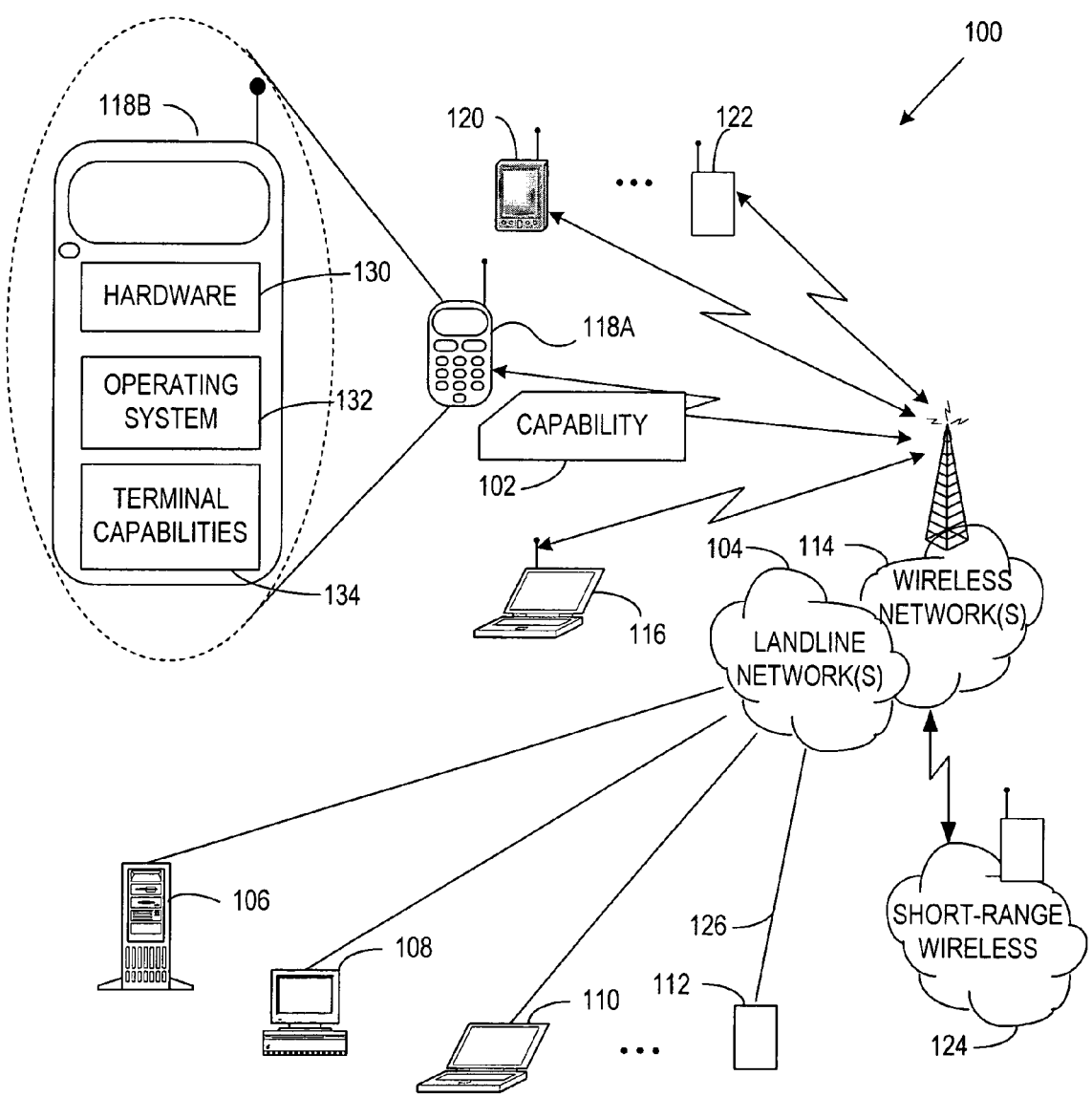
FIG. 1 illustrates a system environment in which a mobile terminal according to embodiments of the present invention may be employed.

Referring now to FIG. 1, a representative system environment 100 is illustrated in which terminal capabilities 102 may be discovered and communicated according to embodiments of the present invention. In the representative system environment 100, terminal capabilities 102 may be communicated between target devices in any number of known manners. These manners include via a landline network(s) 104, which may include a Global Area Network (GAN) such as the Internet, one or more Wide Area Networks (WAN), Local Area Networks (LAN), and the like. Any computing device or other electronic device that supports data processing services may be the target system that utilizes the present invention, such as servers 106, desktop computers 108 or workstations, laptop or other portable computers 110, or any other similar computing device capable of communicating via the network 104, as represented by generic device 112.

Terminal capabilities 102 may be communicated via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device that can utilize data processing services may be a target device that utilizes the invention, such as laptop or other portable computers 116, mobile phones 118A and other mobile communicators, Personal Digital Assistants (PDA) 120, or any other similar computing device capable of communicating via the wireless network 114, as represented by generic device 122.

The terminal capabilities 102 may be communicated between devices using short-range wireless technologies 124, such as Bluetooth, Wireless Local Area Network (WLAN), infrared (IR), etc. The terminal capabilities 102 may also be communicated using direct wired connections, such as depicted by connection path 126. The present invention is applicable regardless of the manner in which data is provided or distributed between the target devices.

An example of a target device that utilizes data processing services is illustrated as the mobile terminal 118B. The mobile terminal 118B includes, for example, hardware 130 suitable for executing instructions used for utilizing data processing services. The hardware 130 can be coupled to an operating system (OS) 132 that provides hardware access and other services to application software. A capabilities descriptor module 134 can provide information such as hardware and software capabilities of the terminal 118B. The capabilities descriptor module 134 may be implemented as firmware or as a program running on the OS 130.

In general, the mobile terminal 118B may communicate its capabilities using any manner of messages and/or protocols known in the art. In one example, a specification for describing devices capabilities of mobile devices is the User Agent Profile (UAProf) specification. UAProf is associated with the Wireless Application Protocol (WAP) family of specifications. UAProf is an extension to WAP that enable the communication of a user profiles between wireless network endpoints. Instantiations of these user profiles are referred to as Capability and Preference Information (CPI). A framework known as the Composite Capability/Preference Profiles (CC/PP) defines mechanisms for negotiating UAProf content between various network entities.

The terminal capabilities may be communicated in the form of a full CPI description, or in the form of a UAProf header. The UAProf headers are described under the CC/PP Exchange Protocol specification. The UAProf Profile header is a request header used to transport one or many profile descriptors and/or Uniform Resource Identifiers (URIs) that reference a profile descriptor. This set of profile descriptors can be used to construct a CPI. Another header defined under CC/PP, the Profile-Diff header, is used to transport changes to the CPI. This means that the Profile-Diff header is used together with and referenced by the Profile header.

The following description may include example implementations of UAProf headers and CPI capabilities descriptors according to the UAProf specification. It will be appreciated by those skilled in the art that the concepts described may be applied to other capabilities descriptor mechanisms, as well as other computer applications where description and negotiation of device capabilities is concerned.

Figure 2:
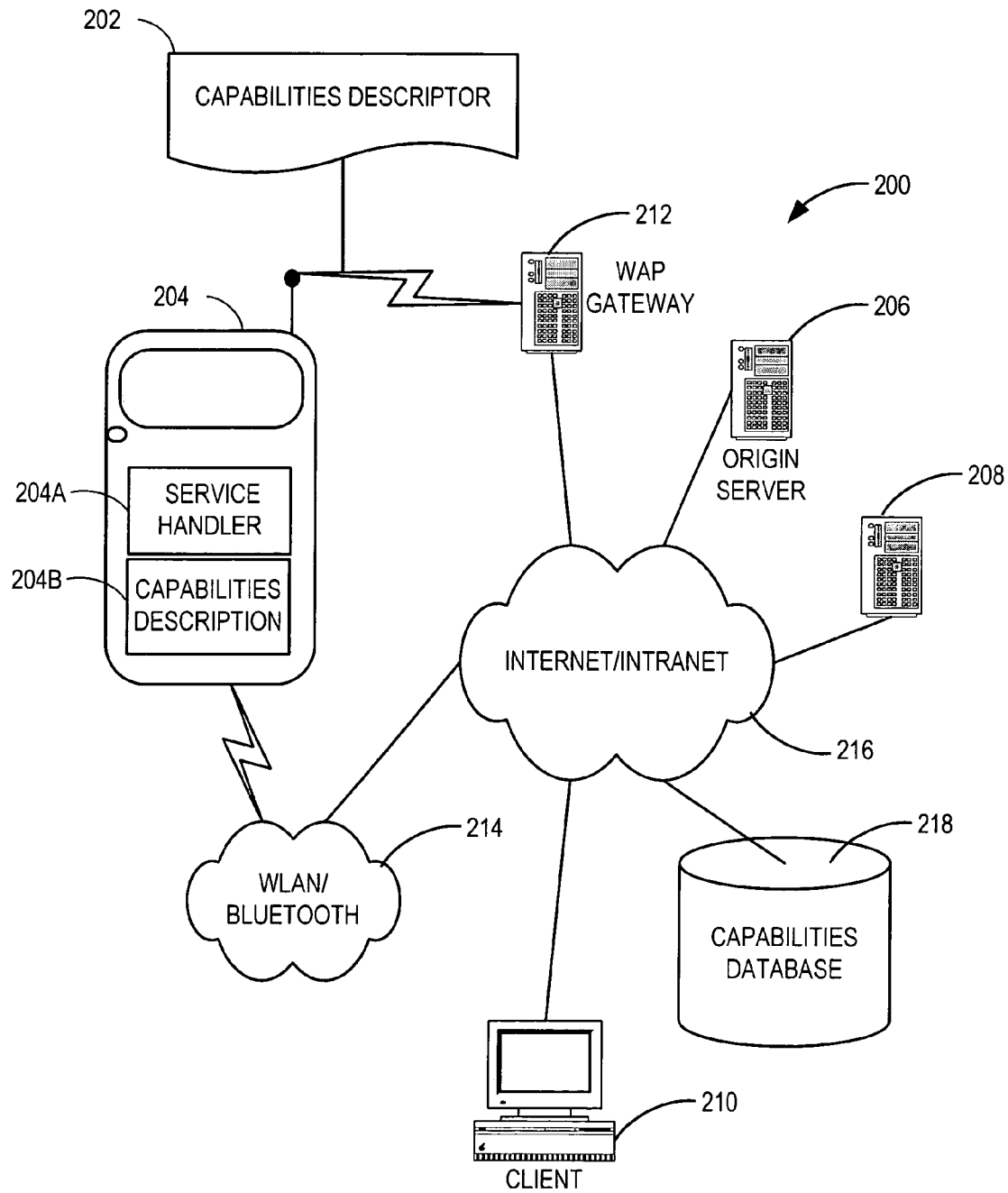
FIG. 2 illustrates a system diagram in which capabilities updates according to embodiments of the present invention may be employed.

Turning now to FIG. 2, a network arrangement 200 is illustrated showing capabilities data being communicated in accordance with embodiments of the present invention. The capabilities descriptor in this example is a UAProf CPI profile 202. All or part of the CPI profile 202 is typically communicated between a WAP client 204 (e.g., mobile terminal) and a network entity such as an origin server 206. An origin server 206 is a data processing arrangement that responds to WAP client requests by delivering appropriate content or error messages to the client. The origin server may process requests via Hypertext Transfer Protocol (HTTP) or Wireless Session Protocol (WSP). WSP is functionally similar to HTTP, and includes additional features (e.g., long-lived sessions, data push facilities, session suspend/resume, etc.) tailored for communication via wireless networks.

The mobile terminal 204 is typically configured to communicate via a cellular-type wireless connection, as exemplified by the communication link to the WAP gateway 212. The mobile terminal 204 may also be configured for short-range wireless, wired, or infrared data access, such as indicated by the WLAN/Bluetooth networks 214. The mobile terminal 204 can initiate connections via an intranet/Internet 216 to communicate capabilities data 202 to network entities such as the origin server 206.

The mobile terminal 204 may include a services handler 204A for dealing with various network data content and services. The mobile terminal may contain a capabilities descriptor 204B that can references capabilities of services handler 204A and any other hardware or software of the mobile terminal 204. The capabilities descriptor 204B may be implement as a functional module that can communicate terminal capabilities data to network entities such as the origin server 206.

The origin server 206 can act as a services provider by executing programs to deliver content and/or services to the mobile terminal 204. The content/services may include any combination of Web services, multimedia sessions, Java applets, text messaging, WAP Push messages, voice traffic, etc. The services and content may be provided to the terminal 204 at the request of the origin server 206, or at the request of another network entity, such as a Web client 210. Due to the wide variety of potential content and services deliverable to the terminal 204, it is important that the origin server 206 know beforehand what capabilities are supported on the terminal 204.

The origin server 206 can use UAProf to tailor the content and services it delivers in accordance with the CPI profile 202 associated with the mobile terminal 204. It will be appreciated that the term "origin server" refers to any content generation and service provider functionality available via the network. The apparatus that provides origin services may be any combination of stand-alone Web servers and/or distributed computing arrangements, and may be co-located with other network entities such as proxies and gateways.

The UAProf specification defines components and attributes that WAP-enabled devices may convey within the CPI profile 202. The data in the CPI profile 202 may include hardware characteristics (screen size/resolution, color depth, image capabilities, manufacturer, etc.), software characteristics (operating system type and version, list of audio and video codecs, etc.), application/user preferences (browser identifier and version, markup languages and versions supported, scripting languages supported, etc.), WAP characteristics (WML script libraries, WAP version, etc.), and network characteristics (bearer characteristics such as latency, quality of service, reliability, etc.).

The CPI profile 202 typically travels between intermediate network entities such as base stations, routers, proxies and gateways, as exemplified by network entity 208. These intermediary network entities 208 may also add to or modify capabilities of a CPI as it is communicated between the mobile device and the origin server. This modification of the CPI can be used to account for network performance capabilities that are only known by the intermediate nodes.

The CPI profile 202 according to UAProf is formed as an XML formatted message using the Resource Description Framework (RDF). As a result, the CPI profile 202 associated with a given device contains a large amount of data relative to the limited data bandwidth inherent in wireless data links. Therefore, instead of sending the CPI profile, the mobile terminal 204 may instead send a reference to the CPI profile 202 that is stored in a network accessible data store 218.

The reference to the data store 218 may include a Uniform Resource Identifier (URI) or Uniform Resource Locator (URL). Those skilled in the art will appreciate that a URI is an identifier for an object or resource formed from a sequence of characters with a restricted syntax. A URL is a specific type of URI, and is used for identifying resources via a representation of primary access mechanism of the resource. By sending a URI/URL referencing the CPI profile 202, the mobile terminal 204 can communicate its capabilities using a reduced set of data thereby conserving network bandwidth.

It will be appreciated that other reference data besides a URI or URL may be sent to an origin server or other network entity to describe terminal capabilities. In one example, the mobile terminal may transmit a terminal identifier such any combination of a model number, serial number, and component identifiers. Component identifiers may include machine readable hardware identifiers (e.g. MAC address, processor ID, EEPROM ID, etc.) or unique identifiers associated with installed software modules. Although these types of identifiers may also be used in a CPI Profile 202, the origin server 206 may be configured to accept a minimal set of data (e.g., terminal model number) for a base set of capabilities. In other arrangement, the origin server 206 may accept a combination (e.g., concatenation) of various data for capabilities determination and/or verification.

In WAP enabled terminals, the CPI profile 202 is typically communicated to the origin server 206 or other network entity when the mobile terminal 204 initiates a WAP session. In a mobile terminal 204 according embodiments of the present invention, however, the CPI profile 202 can be communicated to the origin server 206 during a startup sequence of the mobile terminal 204 and prior to establishing any WAP or other data transfer sessions. The startup sequence is most often associated with booting of the device, although the startup sequence may include sequences associated with connecting and/or disconnecting from networks.

Figure 3:
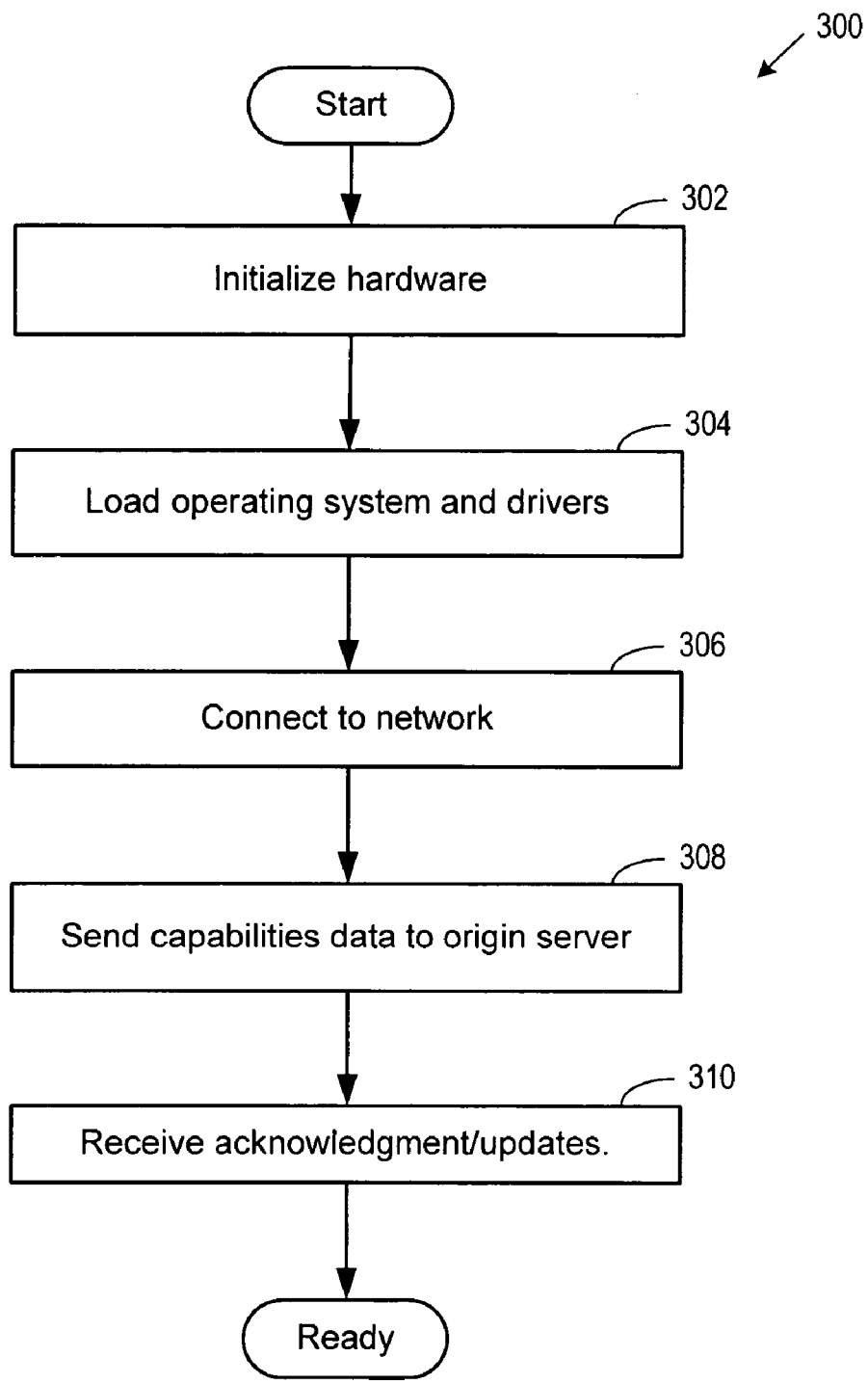
FIG. 3 illustrates a procedure for communicating capabilities data as part of a terminal startup sequence according to embodiments of the present invention.

In reference now to FIG. 3, a flowchart 300 illustrates a startup sequence that includes transmission of a capabilities description according to embodiments of the present invention. In most cases, the routine 300 begins when the hardware is initialized (302), such as when the unit is powered on or reset. The hardware will then load (304) an operating system and hardware drivers. Many devices will then automatically attempt to connect (306) to a network. Some devices may be initialized in an unconnected mode, in which case the connection (306) is initiated by some event that occurs after startup, such as a user initiated request. In scenarios where the unit is running but not connected, the relevant startup sequence may begin when the connection (306) is attempted.

Once the unit is connected (306), the capabilities of the unit can be communicated (308) to an origin server. In some situations, a user confirmation may be required before communicating (308) this data to protect user privacy and similar concerns. The communication (308) of capabilities data may include sending any manner of data usable for determining the unit's capabilities, such as a CPI profile, a terminal ID, or a reference (e.g., URL) to a profile in network accessible storage. The origin server may send an acknowledgement (310) to the unit. This acknowledgement (310) may include any modification data concerning the CPI, such as network bearer capabilities.

Figure 4:
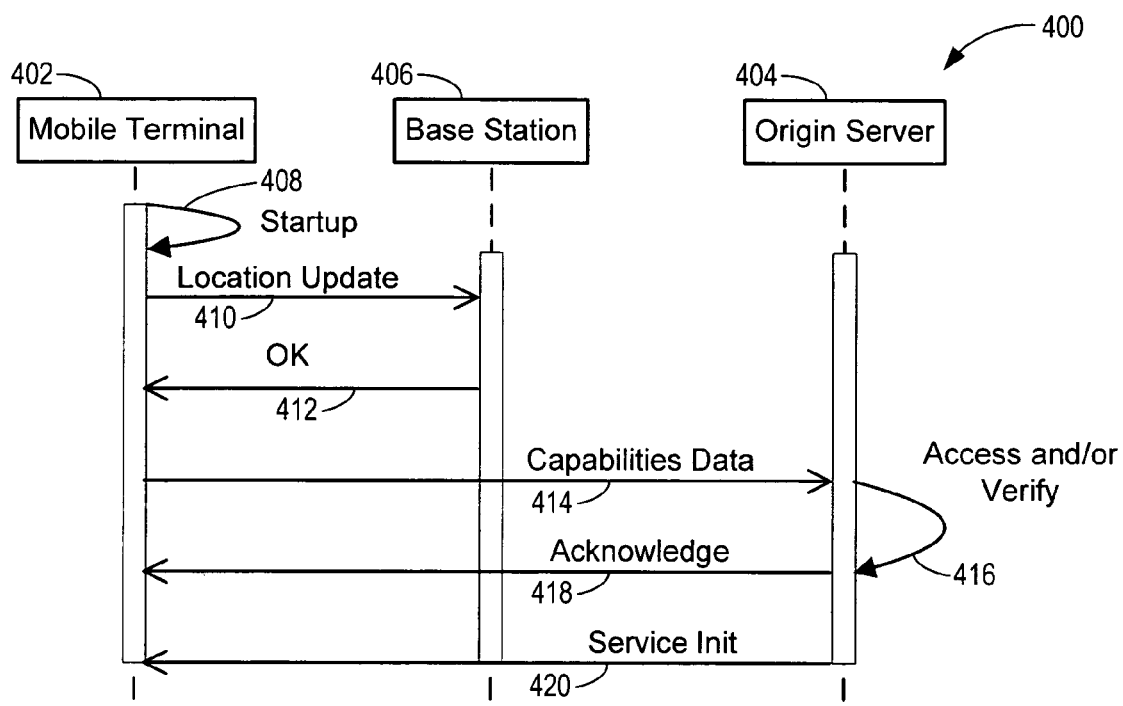
FIG. 4 illustrates a sequence for communicating capabilities data over a wireless data control channel according to embodiments of the present invention.

The mobile terminal may communicate capabilities information to an origin server using any data transfer mechanisms known in the art. A sequence diagram 400 of FIG. 4 illustrates transferring capabilities information using a wireless control channel according to embodiments of the present invention. Many wireless standards such as GSM, UMTS, PCS, etc., use control channels that are processed separately from the traffic channels (e.g., voice). These channels can be used for signaling between the network and the mobile terminal.

For example, the GSM standard defines a Standalone Dedicated Control Channel (SDCCH). The SDCCH is used between the mobile terminal and the Base Transceiver Station (BTS) during call set-up, before a Traffic Channel (TCH) is allocated. The SDCCH is used to provide a reliable connection for signaling and SMS (Short Message Service) messages. In the example of FIG. 4, the control channel can also be used to communicate capabilities between a mobile terminal 402 an origin server 404 or other network entity.

When the mobile terminal 402 is switched on (408), it immediately contacts the BTS 406 to register the terminal's presence on the network. This is sometimes known a location update (410). The BTS 406 relays this information to the nearest exchange (not shown), which stores the information. The mobile terminal 402 will typically receive a confirmation (412) of the location update. At this point, the mobile terminal 402 may communicate (414) capabilities data either directly or indirectly to the origin server 404.

The capabilities data can be communicated (414) over a control channel such as the SDCCH. For example, the capabilities data can be sent via the SDCCH as an SMS message targeted for a destination number related with the origin server 404. The origin server 404 can listen for incoming SMS messages and act (416) on the received capabilities data. If the capabilities data is a CPI profile or system identifier, the origin server 404 may parse, verify and store the data. If the capabilities data is a reference to a stored profile descriptor, the origin server 404 may locate and verify the actual descriptor. In some cases the origin server 404 can retrieve and cache a local copy of the descriptor (e.g., CPI profile).

The origin server 404 may provide an acknowledgment (418) to the mobile terminal 402 that indicates whether or not the capabilities data was successfully received, as well as indicating any updates to the profile. After the origin server 404 has access to the capabilities data, a service can be initialized (420) by the origin server 404 based on the capabilities description and without any further action on the part of the terminal user.

Figure 5:
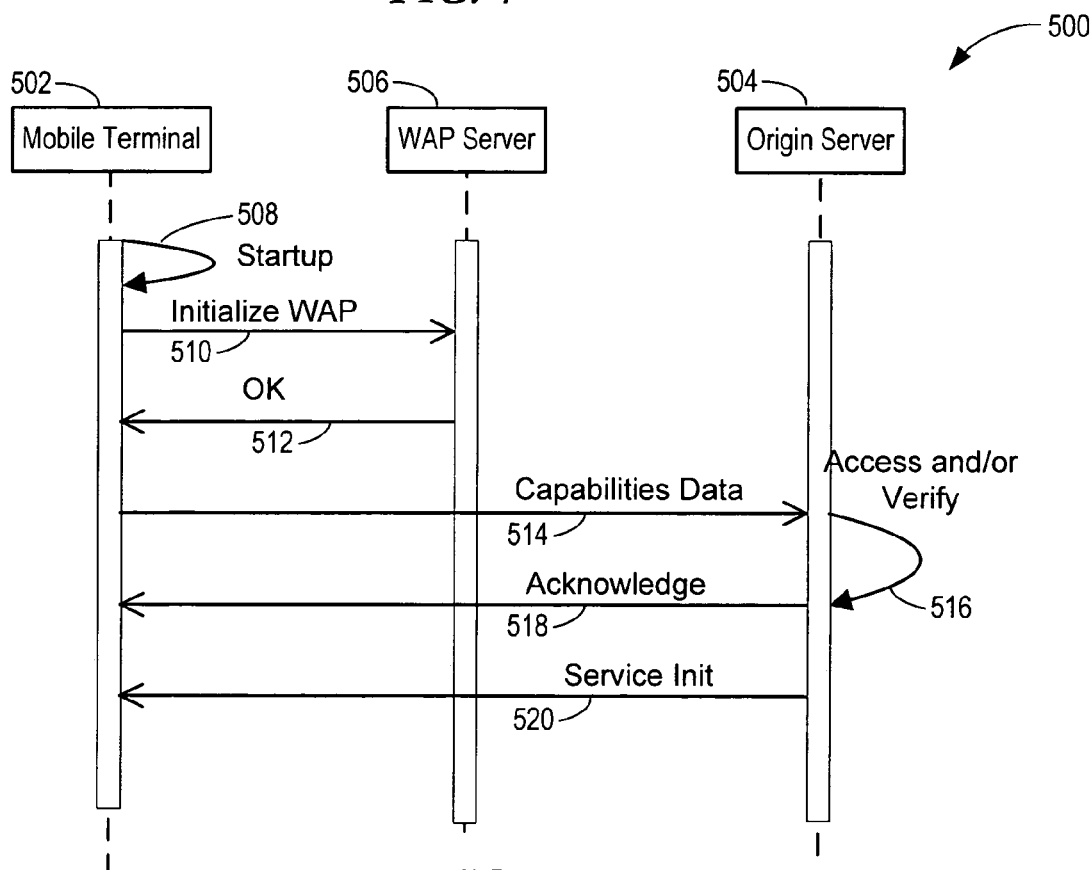
FIG. 5 illustrates a sequence for communicating capabilities data over a WAP network according to embodiments of the present invention.

The sequence 400 illustrated in FIG. 4 utilizes the legacy capabilities of a wireless communications network such as GSM. The WAP architecture extends the capabilities of wireless bearers and provides other mechanisms that can be used by WAP enabled phones to communicate capabilities data. An example of a WAP implementation of capabilities data registration according to embodiments of the present invention is illustrated in FIG. 5. A sequence diagram 500 illustrates communications between a mobile terminal 502 and an origin server 504 via a WAP server 506.

In response to a startup sequence (508) of the mobile terminal 502, the terminal 502 initializes (510) WAP services with the WAP server 506. Upon success (512) of the initiation, the capabilities data can be sent (514) to the origin server 504. In this example, the capabilities data is sent (514) directly to the origin server 504. It will be appreciated that intermediate network entities (e.g., gateways, routers) usually lie between any data "directly" sent from the mobile terminal 502 to the origin server 504. In this example the mobile terminal 502 may have Mobile IP that allows sending data directly using Internet/intranet protocols such as TCP/IP. In other arrangements, the capabilities data can be sent via the WAP server 506, which then can forward the data to its destination using the appropriate Internet/intranet protocols.

Once the origin server 504 receives the capabilities data, the data is processed (516) as previously described in relation to FIG. 4. An acknowledgement is sent (518) and thereafter the origin server 504 (or any other network entity) can initiate (520) a service with the mobile terminal 502 based on the capabilities data received by the origin server 504.

In the example of FIG. 5, the mobile terminal 502 initiated the sending of capabilities data as part of a startup sequence. In the sequence diagram 600 of FIG. 6, a mobile terminal 602 responds to a server-initiated capabilities request from a WAP server 606 according to embodiments of the present invention. The mobile terminal 602 initiates (608) a startup sequence and registers (610) with the WAP server 606 as part of the startup sequence. After network registration is confirmed (612), the WAP server 606 requests (614) capabilities data from the mobile terminal 602.

The WAP server may send the request (614) to the mobile terminal 602 using a technique such as a WAP Over-The-Air (OTA) Push. The WAP specification defines the OTA Push for delivery of content to a WAP client from a WAP server. The OTA Push is a thin, stateless, application protocol layer that can be built using WSP or HTTP as an application transport layer. Push OTA provides the ability to push contents to WAP clients, as well as related functionality such as facilitating server-initiated asynchronous pushes, application addressing, defining exchange of push control information over the air, facilitating bearer selection and controls, and determining the authentication of a push initiator.

In the illustrated example, the mobile terminal 602 responds (616) to a capabilities request (614) with capabilities data, which is sent (618) by the WAP server 606 to an origin server 604. The origin server 604 processes (620) the capabilities request as previously detailed. The origin server 604 can also send an acknowledgement (not shown) to the mobile terminal 602, either directly or via the WAP server 606. The origin server 604 can thereafter initiate (622) a service based on the capabilities data of the mobile terminal 602. In this example, the service is initiated (622) by a communication from the origin server 604 to the WAP server 606. The WAP server 606 forwards (624) the service request to the mobile terminal 602 using any available mechanism, such as WAP OTA Push using WSP or HTTP.

Figure 6:
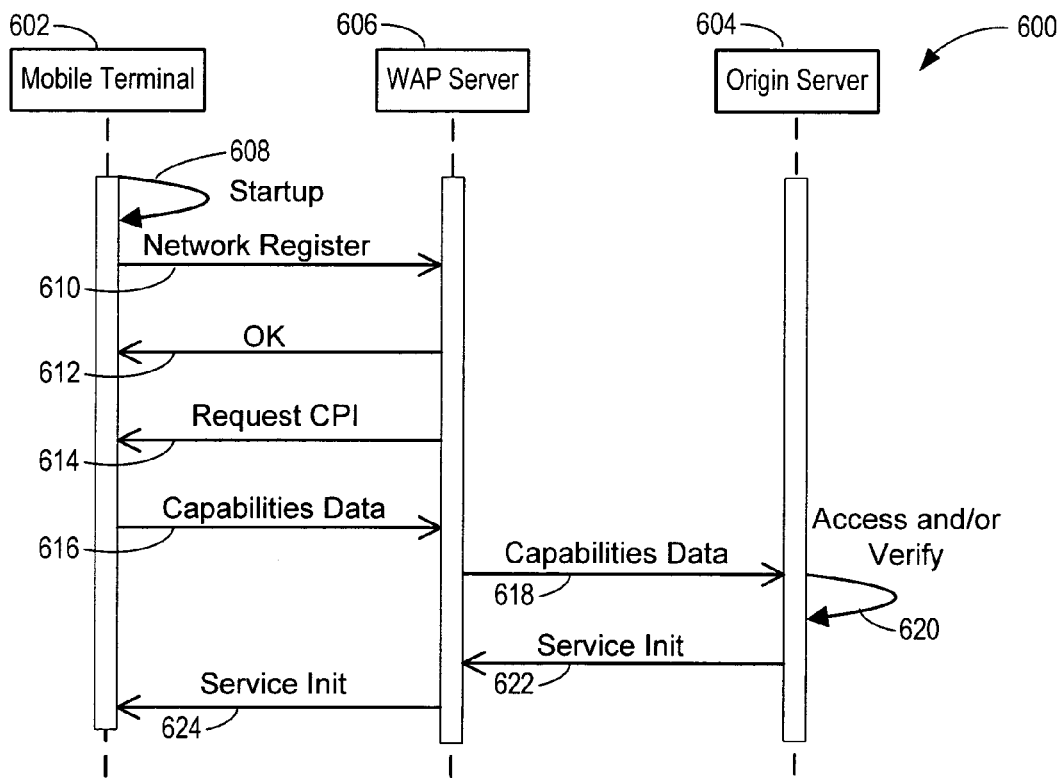
FIG. 6 illustrates a sequence for communicating capabilities data over a WAP network using a server initiated request according to embodiments of the present invention.
Figure 7:
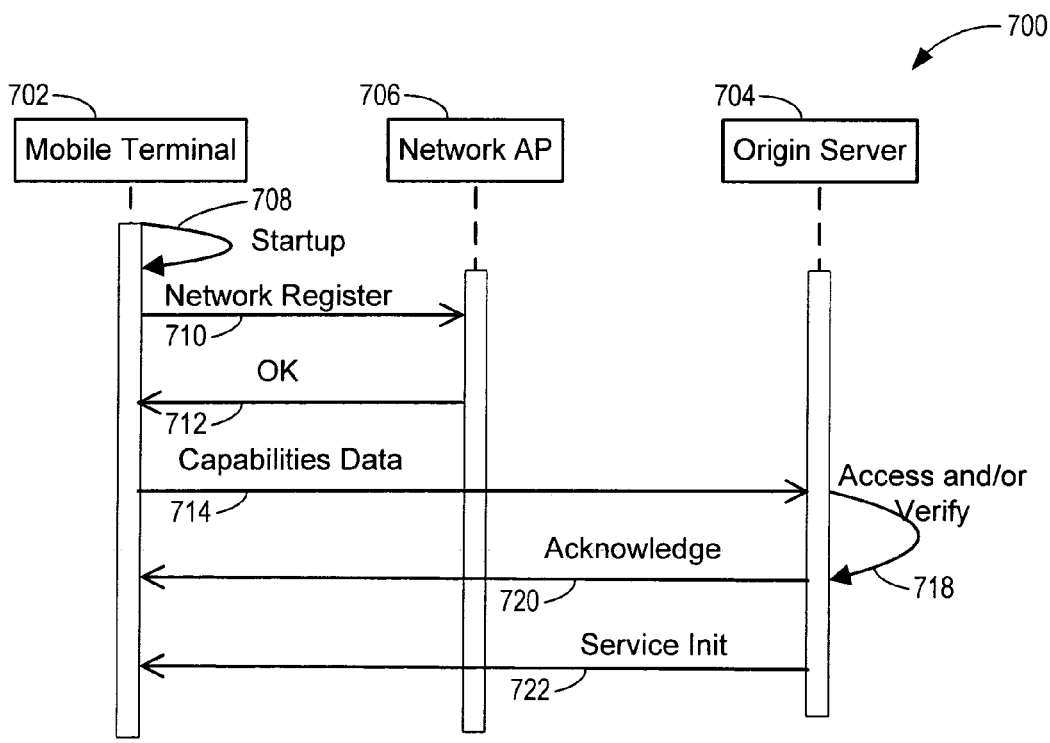
FIG. 7 illustrates a sequence for communicating capabilities data over via a network access point according to embodiments of the present invention.

Although the examples in FIGS. 4-6 utilize wireless communications associated with cellular networks, it will be appreciated that some mobile devices may have capabilities to communicate using other types of physical layer protocols. For example, intranet and Internet connectivity may be provided to mobile devices using wireless standards such as IEEE 802.11 Wireless Local Area Network (WLAN) and Bluetooth. The mobile devices may also include wired network access, such as using Ethernet or Universal Serial Bus (USB) ports. These wired and wireless protocols can give mobile devices direct access to networks using TCP/IP and/or other network protocols. A sequence diagram 700 in FIG. 7 illustrates a mobile terminal 702 communicating capabilities data using a network access point 706 according to embodiments of the present invention.

The mobile terminal 702 initiates (708) a startup sequence, which may include device startup and/or network initialization/acquisition. The mobile terminal 702 registers (712) with the access point 706 and receives acknowledgement. Since the wired and wireless network technologies may provide the mobile terminal 702 with direct IP network access, the mobile terminal 702 can send (714) capabilities data directly to an origin server 704. The origin server 704 can process (718) the capabilities data and directly acknowledge (720) receipt. The origin server 704 can thereafter initiate (722) services with the mobile terminal 702 based on the capabilities data. It will be appreciated that the services may be initiated (722) either via the networking access point 706 or via other wireless technologies such as WAP.

The communication of capabilities as described herein is useful given the transient nature of mobile devices. In general, the mobile devices may appear asynchronously at any given location on a network, and the capabilities of the device may not be apparent without first communicating capabilities data. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the multimedia session functionality as described herein. Hardware, firmware, software or a combination thereof may be used to perform the various session descriptor functions described herein.

Figure 8:
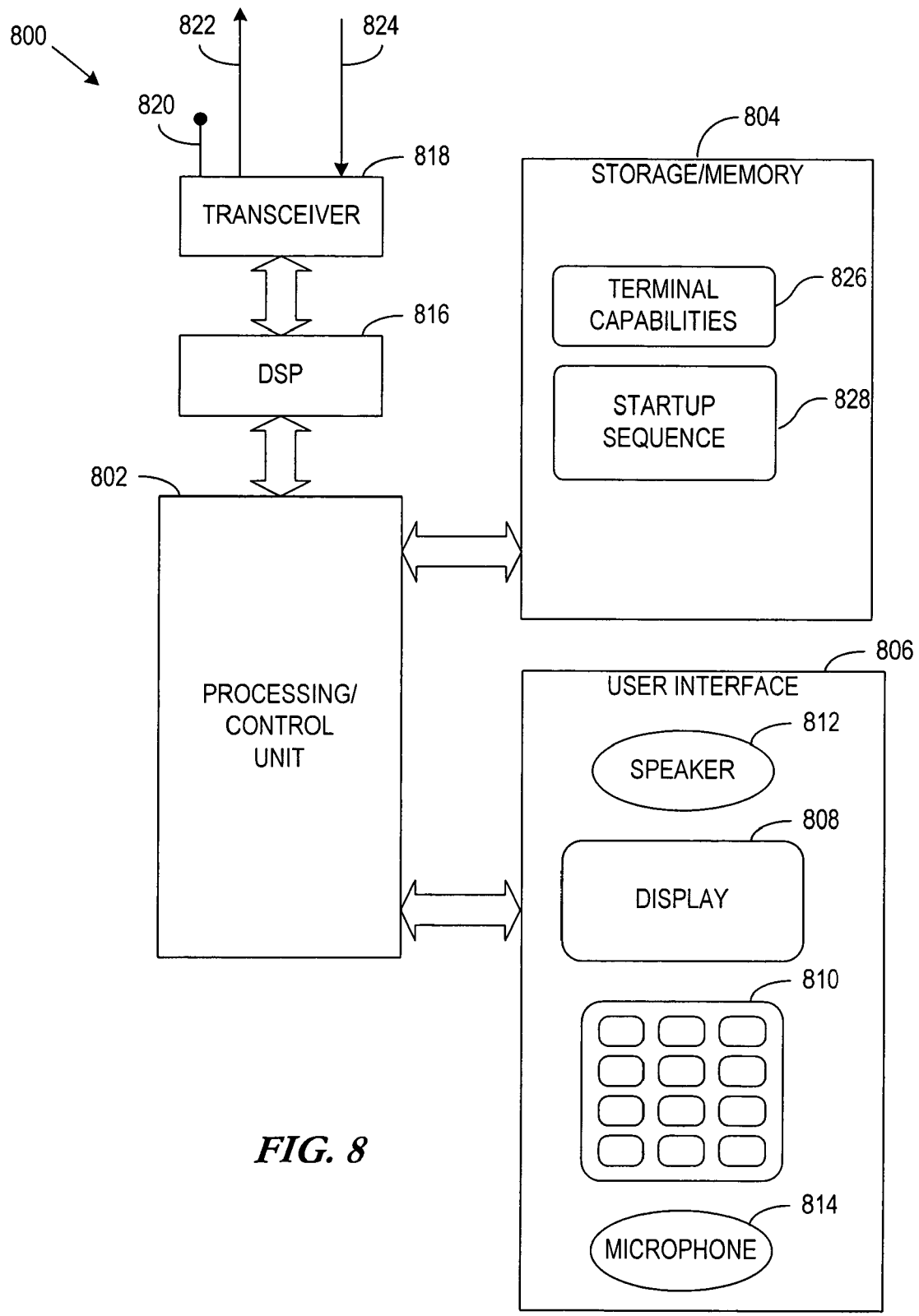
FIG. 8 illustrates an example mobile terminal in which capabilities communication may be employed according to embodiments of the present invention.

An example of a representative mobile terminal computing system capable of carrying out operations in accordance with the invention is illustrated in FIG. 8. Those skilled in the art will appreciate that the exemplary mobile computing environment 800 is merely representative of general functions that may be associated with such mobile devices, and also that landline computing systems similarly include computing circuitry to perform such operations.

The mobile computing arrangement 800 is suitable for processing multimedia session descriptions in accordance with embodiments of the present invention. The representative mobile computing arrangement 800 includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile terminal, and also those functions associated with the present invention as dictated by the capabilities description module 826 and a startup sequence 828 available in the program storage/memory 804. Thus, the processing unit 802 may be capable of detecting, modifying, and communicating terminal capabilities using the capabilities description module 826. The startup sequence 828 can be arranged to initiate communication of terminal capabilities via the capabilities description module 826 as an appropriate time.

The program storage/memory 804 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 804 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 800 via data signals, such as being downloaded electronically via one or more networks, such as the Internet and an intermediate wireless network(s).

The processor 802 is also coupled to user-interface 806 elements associated with the mobile terminal. The user-interface 806 of the mobile terminal may include, for example, a display 808 such as a liquid crystal display, a keypad 810, speaker 812, and microphone 814. These and other user-interface components are coupled to the processor 802 as is known in the art. Other user-interface mechanisms may be employed, such as voice commands, switches, touch pad/screen, graphical user interface using a pointing device, trackball, joystick, or any other user interface mechanism.

The mobile computing arrangement 800 also includes conventional circuitry for performing wireless transmissions. A digital signal processor (DSP) 816 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to an antenna 820, transmits the outgoing radio signals 822 and receives the incoming radio signals 824 associated with the wireless device.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc.

Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system, apparatus, and method in accordance with the present invention.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
   initiating a device startup sequence of a mobile computing arrangement, wherein the device startup sequence comprises at least one of a hardware initialization of the mobile computing arrangement and a network registration of the mobile computing arrangement;
   communicating a capability descriptor of the mobile computing arrangement to a service provider entity as part of the startup sequence and before a user-initiated network session with the service provider entity is requested via the mobile computing arrangement;
   receiving, from the service provider independently of user requests, a data service targeted for the mobile computing arrangement based on the capability descriptor communicated to the service provider; and
   utilizing the data service at the mobile computing arrangement in accordance with the capability descriptor.

2. The method according to claim 1, wherein the capability descriptor comprises a Universal Resource Locator (URL).

3. The method according to claim 2, wherein the URL references a User Agent Profile (UAProf) descriptor.

4. The method according to claim 1, wherein the capability descriptor comprises a User Agent Profile (UAProf) descriptor.

5. The method according to claim 1, wherein the capability descriptor comprises a User Agent header.

6. The method according to claim 1, wherein the capability descriptor comprises a terminal model identifier.

7. The method according to claim 1, wherein communicating the capability descriptor of the mobile computing arrangement comprises communicating the capability descriptor targeted for the services provider via Short Message Service (SMS).

8. The method according to claim 1, wherein communicating the capability descriptor of the mobile computing arrangement comprises communicating the capability descriptor to the services provider via a wireless network control channel associated with a network registration of the mobile computing arrangement.

9. The method according to claim 1, wherein communicating the capability descriptor of the mobile computing arrangement comprises communicating the capability descriptor targeted for the services provider via a secondary network interface of the mobile computing arrangement.

10. The method according to claim 9, wherein the secondary network interface of the mobile computing arrangement comprises a wireless local area network (WLAN) interface.

11. The method according to claim 9, wherein the secondary network interface of the mobile computing arrangement comprises a Bluetooth network interface.

12. The method according to claim 1, further comprising communicating a capabilities request targeted to the mobile computing arrangement, and wherein the capability descriptor targeted for the service provider entity is communicated in response to the capabilities request.

13. The method according to claim 12, wherein the capabilities request is communicated via a Wireless Application Protocol (WAP) Over The Air (OTA) Push.

14. A system, comprising:
a services provider coupled to a network and adapted for providing data services to computing arrangements;
a mobile computing arrangement coupled to the network, comprising:
a network interface for communicating via the network;
a memory for storing at least one of a services module and a capability descriptor configured to describe services utilizable by the mobile computing arrangement; and
a processor coupled to the memory and the network interface, the processor operable via the services module to
send the capability descriptor to the services provider via the network interface as part of a startup sequence of the mobile computing arrangement and before a user-initiated network session with the service provider is requested via the mobile computing arrangement, wherein the device startup sequence comprises at least one of a hardware initialization of the mobile computing arrangement and a network registration of the mobile computing arrangement; and
receive, independently of user requests. a data service initiated by the services provider based on the applications capability descriptor.

15. The system according to claim 14, wherein the capability descriptor comprises a Universal Resource Locator (URL) referencing a User Agent Profile (UAProf) descriptor.

16. The system according to claim 14, wherein the capability descriptor comprises a User Agent Profile (UAProf) descriptor.

17. The system according to claim 14, wherein the capability descriptor comprises a User Agent Profile (UAProf) header.

18. The system according to claim 14, wherein the capability descriptor comprises a terminal model identifier.

19. The system according to claim 14, wherein the capability descriptor is communicated to the services provider via Short Message Service (SMS).

20. The system according to claim 14, wherein the capability descriptor is communicated to the services provider via a wireless network control channel associated with a network registration of the mobile computing arrangement.

21. An apparatus comprising:
a network interface configured to facilitate exchange of data via a network;
a memory capable of storing at least one of a services module and a capability descriptor usable for describing services utilizable by the apparatus; and
a processor coupled to the memory and the network interface, the processor operable by the services module to:
send the capability descriptor to a service provider via the network interface as part of a startup sequence of the apparatus and before a user-initiated network session with the service provider is requested via the apparatus, wherein the device startup sequence comprises at least one of a hardware initialization of the apparatus and a network registration of the apparatus; and
receive, independently of user requests, a data service initiated by the service provider based on the capability descriptor.

22. The apparatus according to claim 21, wherein the capability descriptor comprises a Universal Resource Locator (URL) referencing a User Agent Profile (UAProf) descriptor.

23. The apparatus according to claim 21, wherein the capability descriptor comprises a User Agent Profile (UAProf) descriptor.

24. The apparatus according to claim 21, wherein the capability descriptor comprises a User Agent Profile (UAProf) header.

25. The apparatus according to claim 21, wherein the capability descriptor comprises a terminal model identifier.

26. The apparatus according to claim 21, wherein the capability descriptor is communicated to the service provider via Short Message Service (SMS).

27. The apparatus according to claim 21, wherein the capability descriptor is communicated to the services provider via a wireless network control channel associated with a network registration of the mobile computing arrangement.

28. A computer-readable storage medium having instructions stored thereon which are executable for performing steps comprising:
detecting a device startup sequence of a mobile computing arrangement, wherein the device startup sequence comprises at least one of a hardware initialization of the mobile computing arrangement and a network registration of the mobile computing arrangement;
determining a capability descriptor usable for describing services utilizable by the mobile computing arrangement;
communicating the capability descriptor of the mobile computing arrangement to a service provider as part of the startup sequence and before a user-initiated network session with the service provider is requested via the mobile computing arrangement; and receiving, independently of user requests, a data service initiated by the service provider based on the capability descriptor communicated to the service provider.

29. The computer-readable medium according to claim 28, wherein the capability descriptor comprises a Universal Resource Locator (URL) referencing a User Agent Profile (UAProf) descriptor.

30. The computer-readable medium according to claim 28, wherein the capability descriptor comprises a User Agent Profile (UAProf) descriptor.

31. The computer-readable medium according to claim 28, wherein the capability descriptor comprises a User Agent Profile (UAProf) header.

32. The computer-readable medium according to claim 28, wherein the capability descriptor comprises a terminal model identifier.

33. The computer-readable medium according to claim 28, wherein the capability descriptor is communicated to the service provider via Short Message Service (SMS).

34. The computer-readable medium according to claim 28, wherein the capability descriptor is communicated to the service provider via a control channel associated with a wireless network registration of the mobile computing arrangement.

* * * * *

UNITED STATES PATENT AND TRADEMARK OFFICE
CERTIFICATE OF CORRECTION

PATENT NO. : 7,478,146 B2  Page 1 of 1
APPLICATION NO. : 10/700346
DATED : January 13, 2009
INVENTOR(S) : Tervo et al.

It is certified that error appears in the above-identified patent and that said Letters Patent is hereby corrected as shown below:

In the Specification:

Col. 4, line 65: "implement as a functional" should read --implemented as a functional--.

In the Claims:

Column 11, Claim 14, line 62: "requests. a data" should read --requests, a data--.

Signed and Sealed this

Seventeenth Day of November, 2009

David J. Kappos
*Director of the United States Patent and Trademark Office*